United States Patent [19]

Cherdron et al.

[11] 3,872,215

[45] Mar. 18, 1975

[54] PHOSPHATE PURIFICATION PROCESS

[75] Inventors: Egon Cherdron, Limburgerhof/Pfalz; Hans-Joachim Forster, Schwetzingen-Hirschacker; Istvan Potencsik, Mannheim; Manfred Haerter, Neuhofen/Pfalz, all of Germany

[73] Assignee: Gebruder Giulini GmbH, Ludwigshafen/Rhine, Germany

[22] Filed: June 16, 1971

[21] Appl. No.: 153,471

[30] Foreign Application Priority Data
June 16, 1970 Germany............................ 2029546

[52] U.S. Cl................. 423/309, 423/313, 423/321
[51] Int. Cl. ..................... C01b 15/16, C01b 25/26
[58] Field of Search.. 23/106 A, 106 R, 107, 165 C; 423/321, 307–309, 311–313, 157

[56] References Cited
UNITED STATES PATENTS
| | | | |
|---|---|---|---|
| 1,929,443 | 10/1933 | Milligan................................ | 23/107 |
| 2,885,265 | 5/1959 | Cunninghan........................... | 23/165 |
| 3,375,068 | 3/1968 | Frohlich et al. ...................... | 23/165 |
| 3,556,739 | 1/1971 | Baniel et al......................... | 23/165 X |

FOREIGN PATENTS OR APPLICATIONS
464,370    4/1937    Great Britain........................ 23/165

Primary Examiner—Oscar R. Vertiz
Assistant Examiner—Gregory A. Heller
Attorney, Agent, or Firm—Spencer & Kaye

[57] ABSTRACT

Crude phosphoric acid is mixed with an organic solvent or solvent mixture having the ability to absorb at least 9 weight-% water as based on solution weight. From this mixture, a water/phosphoric acid/solvent phase is withdrawn and mixed with an aqueous solution of NaOH in an amount equal to 1 to 40 weight-% calculated as oxide and based on the amount required for producing $NaH_2PO_4$ from the phosphoric acid present in the water/phosphoric acid/solvent phase. Following this mixing, a water/phosphoric acid/solvent phase is withdrawn and mixed with an aqueous solution of NaOH in an amount for causing at least $NaH_2PO_4$ to pass from the water/phosphoric acid/solvent phase into an aqueous phase. The $NaH_2PO_4$ in this aqueous phase is a significantly purer form of $P_2O_5$ than was the initial crude acid.

13 Claims, 1 Drawing Figure

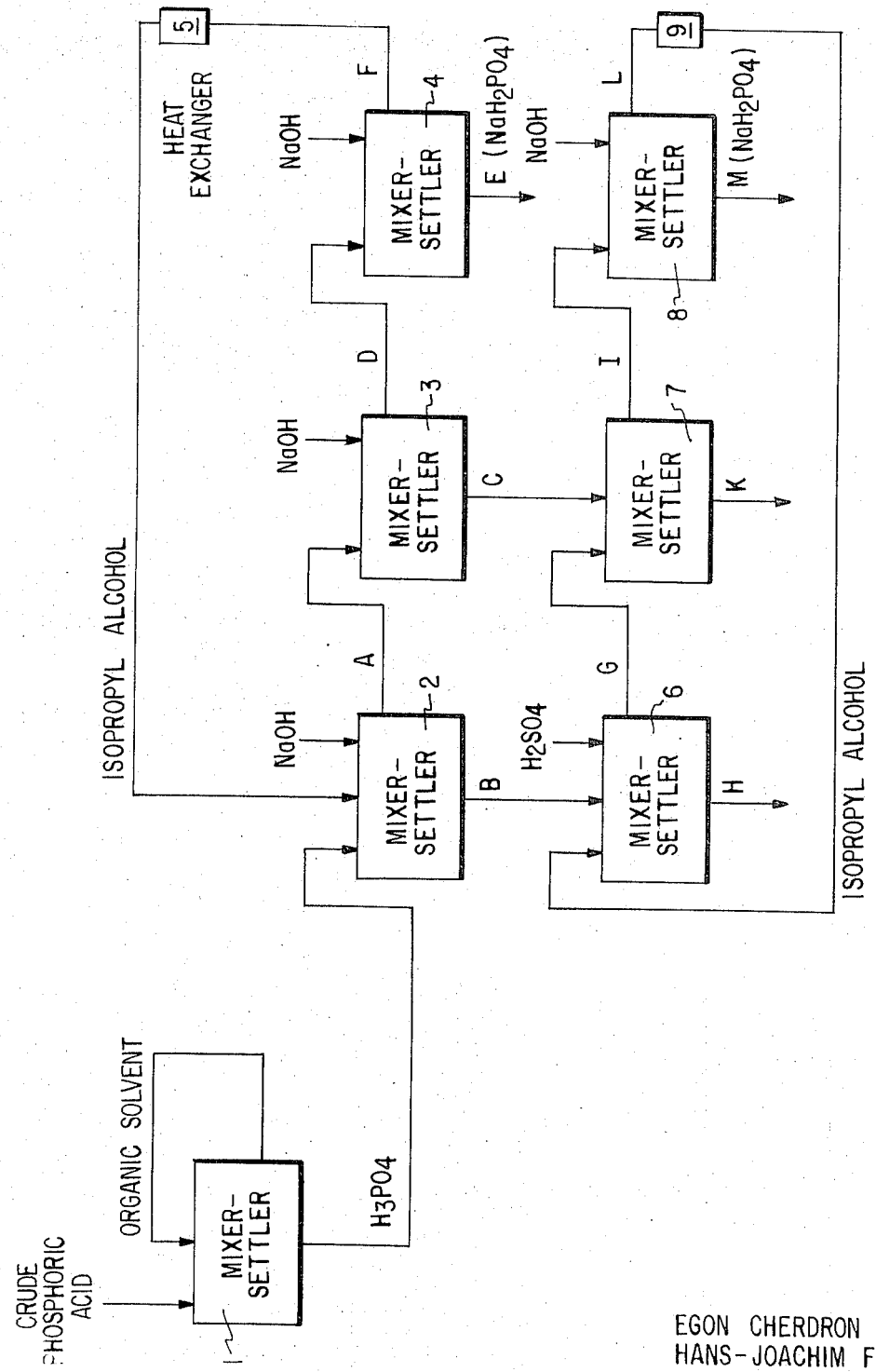

PHOSPHATE PURIFICATION PROCESS

BACKGROUND OF THE INVENTION

The present invention relates to a process for producing pure phosphates from impure phosphoric acid containing inorganic and perhaps organic impurities, such as the phosphoric acid resulting from the wet chemical decomposition of crude phosphates with acid. The process of the invention uses an organic solvent to create two-phase systems in which the impurities preferentially accumulate in aqueous phases as opposed to organic phases.

Organic and/or inorganic impurities render phosphoric acid and its salts unsuitable for use in certain areas, for example in the food industry. For this reason, a good number of processes for getting rid of such impurities has been proposed. However, for reasons both of economy and of effectiveness in eliminating the impurities, these processes have not been satisfactory. This is true in many cases even for those processes which use a water-immiscible solvent for removing the impurities by extracting the crude phosphoric acid.

According to the selective extraction described in German Pat. No. 1,277,221 for example, the phosphoric acid is brought into contact with an amine which is immiscible with water, or with a corresponding amine salt or a corresponding quaternary ammonium compound. The extraction agent is used in such quantities that in removing the anionic impurities only a part of the phosphoric acid is extracted and in removing the cationic impurities the entire phosphoric acid is extracted.

In German Auslegeschrift (published patent application) No. 1,294,944, there is likewise used an organic solvent, which is immiscible with water, for extraction of the crude phosphoric acid. As organic solvent there is used tributyl phosphate, for example. The crude phosphoric acid is mixed with a compound yielding borate ions before being introduced into the first extraction stage. This should prevent above all the precipitation of silicic acid gel which plugs the apparatus for the extraction of the phosphoric acid from the solvent and renders impossible a continuous operation.

It is furthermore known from Netherlands Pat. No. 6,503,909 to use as water-immiscible solvents for the extraction of crude phosphoric acid esters, ketones, and ethers.

German Offenlegungsschrift (laid-open patent application) No. 1,811,813 teaches a process for cleaning the crude phosphoric acid obtained from the acid decomposition of phosphate minerals by first extracting the phosphoric acid with organic, water-immiscible solvents and then back-extracting from the organic solvent in a second battery with an aqueous solution containing phosphate ions and alkali ions.

It has also already been proposed, for example, in U.S. Pat. No. 2,885,265 and German Pat. No. 884,358, to carry out the purification of crude phosphoric acid in a multistage counter-current extraction process and to use butanol as the extraction agent. Such multistage extractions have, however, attained no importance in practice, because of technical problems in their processes.

Finally, U.S. Pat. No. 3,318,661 concerns a process in which diisopropyl ether is used as extraction agent and in which ether and phosphoric acid are subsequently separated from one another by distillation.

The common feature of these known processes is that a water-immiscible agent is used for separating phosphoric acid from its inorganic impurities. In spite of a plurality of extraction stages, there results a high $P_2O_5$ loss, because the phosphoric acid is only partially extracted into the organic phase. The separated impurities contain considerable amounts of $P_2O_5$ and must be processed into low-value products such as fertilizers in order to prevent unbearable $P_2O_5$ losses. Moreover, solvent losses are sustained, because a not insignificant portion remains in the aqueous phase and can, if at all, only be recovered at considerable expense. Conversely, a part of the phosphoric acid remains in the organic phase in the re-extraction of the phosphoric acid out of the organic solvent. Simultaneously, a part of the solvent again gets into the aqueous phase. Even using distillation, the organic solvent cannot be completely recovered out of the phosphoric acid.

Consequently, it is not surprising that extraction processes have scarcely been accepted in the practice. The water-immiscible solvents which have been proposed are mostly very expensive and the losses of $P_2O_5$ and solvent are economically unbearable. In most cases, the purity achieved by these processes is not satisfactory.

From German Pat. No. 884,358, it is alrady known to use completely water-miscible organic solvents, such as methanol, ethanol, and acetone, for purifying phosphoric acid obtained by wet decomposition. Here, however, the inorganic impurities are separated as slimy precipitates whose complete removal presents considerable difficulty, so that also this process has attained no importance in the practice.

SUMMARY OF THE INVENTION

An object of the present invention, therefore, is to provide a process for producing phosphates from impure phosphoric acid in which process the above-described disadvantages are avoided and the purity of the resulting phosphates is considerably improved over that presently obtainable.

This as well as other objects which will become apparent in the discussion that follows are achieved, according to the present invention, by firstly intimately mixing the crude phosphoric acid with an organic solvent or solvent mixture which is able to absorb at least 9 weight-% water as based on solution weight, withdrawing a water/phosphoric acid acid/solvent phase from a first aqueous phase, mixing the water/phosphorix acid/solvent phase with a basic compound in an amount equal to 1 to 40 weight-% calculated as oxide and based on the amount required for producing mono-orthophosphate from the phosphoric acid present in the phase, withdrawing again a water/phosphoric acid/solvent phase from a second aqueous phase, and adding to this water/phosphoric acid/solvent phase at least one basic compound for causing the mono-, di-, or tri-orthophosphate to separate out in an aqueous phase.

BRIEF DESCRIPTION OF THE DRAWING

The single FIGURE is a flow diagram of a process according to the present invention.

DESCRIPTION OF THE PREFERRED EMBODIMENTS

The temperatures during execution of the method of the present invention can lie between 5 and 100°C, and are preferably from 30° to 70°C.

A special advantage of the method according to the present invention is that the $P_2O_5$ losses are very small and are independent of the concentration of the crude phosphoric acid charged to the process. The $P_2O_5$ loss level remains constant over the entire concentration range of the phosphoric acid charged, with the $P_2O_5$ losses amounting during continuous operation of the process to a maximum of 3 weight-%, as based on the $P_2O_5$ charged. The solvent loss for continuous operation of the process lies at 1 to 3 weight-%, as based on the $P_2O_5$ charged. That such good results can be achieved with solvents which can take on at least 9 weight-% water must be termed completely surprising.

The novel process of the invention is furthermore outstanding because it can be carried out very simply. Moreover, all phases in this process occur in liquid form, so that difficult separation steps do not have to be carried out. Both apparatus and time expenses are economically acceptable.

According to the preferred embodiment of the invention, the solvent is completely or partially isopropanol and/or butanol, with the volume ratio phosphoric acid to organic solvent or solvent mixture being from 1:0.25 to 1:20, and preferably from 1:1 to 1:6. The volume ratio phosphoric acid to butanol should, however, be at least 1:4.

In solvent mixtures, it is also acceptable for the present invention to use compounds which do not absorb at least 9 weight-% water. It is only essential that the solvent mixture itself be able to absorb at least 9 weight-% water. Thus, aliphatic alcohols with 4 to 9 carbon atoms and/or hydrocarbons with 6 to 15 carbon atoms, for example butanol, amyl alcohol, hexyl alcohol, cyclohexane, and toluene, mixed with isopropanol, can be used. The amount of water-immiscible solvents, such as aliphatic and aromatic hydrocarbons or aliphatic alcohols with 4 to 9 carbon atoms, depends on the water-absorbing ability of the components of the mixture. For example, for a mixing ratio of phosphoric acid to solvent mixture of 1:4, the hydrocarbon content can be up to 30 voluem-%, so that the isopropanol content lies at at least 70 volume-%.

It was furthermore discovered that it is frequently of advantage when carrying out the process of the present invention to perform the mixing of the crude phosphoric acid with the organic solvent or solvent mixture in the presence of at least one solute alkali compound. This is true above all in those embodiments in which isopropanol is being used as solvent. The alkali content, calculated as oxide, should lie between 0.1 and 6 weight-%, and preferably 1 to 4 weight-%. The calculated alkali oxide content is referred to the phosphoric acid. As alkali compounds there may be used for example the oxides, hydroxides, carbonates and/or phosphates of the alkali metals, for example of sodium and corresponding ammonium compounds, such as ammonia, ammonium hydroxide, and ammonium salts.

Especially suitable alcohol mixtures are: butanol-isopropanol (volume ratio 0:100 to 100:0), benzyl alcohol-isopropanol (volume ratio 0:100 to 80:20), n-hexanol-isopropanol (volume ratio 0:100 to 75:25), i-amyl alcohol-isopropanol (volume ratio 0:100 to 80:20), octyl alcohol-isopropanol (volume ratio 0:100 to 70:30), and cyclohexanol-isopropanol (volume ratio 0:100 to 75:25).

In these solvent mixtures, methanol, ethanol, and acetone can be substituted for isopropanol. However, the portion of solvent which absorbs less than 9 weight-% water must lie above 10 parts in 100, by volume.

In many cases, it is advantageous to remove organic impurities from the crude phosphoric acid in a preliminary cleaning operation. This can, for example, be done conventionally using activated carbon. According to the invention, however, the removal of organic impurities can also proceed using an extraction technique. This extraction is carried out using a water-immiscible organic solvent, above all oxygen-containing organic compounds with 5 to 20 carbon atoms, especially aliphatic, aromatic, and/or cyclic alcohols with one or more OH groups. In this connection it has also proven advantageous to use the oxygen-containing water-immiscible solvent, which can also be a nitro-compound and/or an ester, in mixture with at least one aromatic and/or cyclic hydrocarbon having 6 to 20 carbon atoms, for example benzine, toluene, or diesel oil. The volume ratio hydrocarbon to oxygen-containing compound should here be about 0.1:1 to 10:1, preferably 2:1 to 5:1. According to an especially favorable embodiment according to the invention, the solvent mixture is a mixture of diesel oil and octyl alcohol.

In carrying out the process for removing the organic impurities according to the invention, the temperature should lie between 70° and 100°C, preferably between 40° and 60°C. The quantity of organic water-immiscible solvent or solvent mixture depends on the origin of the phosphoric acid and lies between 1 and 20 volume-%, preferably from 3 to 10 volume-%, as based on the crude phosphoric acid charged.

Further illustrative of the present invention are the following examples:

EXAMPLE I

A crude phosphoric acid obtained by the decomposition of Kola crude phosphate with sulfuric acid was first treated with activated carbon to remove the organic impurities and then concentrated to a solution of 47 weight-% $P_2O_5$. The concentrated crude phosphoric acid had the following impurities, as based on the $P_2O_5$ content:

| | |
|---|---|
| $SO_3$ | 18,700 ppm |
| F | 22,200 ppm |
| CaO and rare earths | 12,750 ppm |
| $Fe_2O_3$ | 10,200 ppm |
| $Al_2O_3$ | 28,600 ppm |
| Cr | 298 ppm |
| $Na_2O$ | 936 ppm |
| MgO | 10,000 ppm |

This acid was mixed with a quantity of a 50% solution of sodium hydroxide to bring the $Na_2O$ level of the resulting solution to 45,000 ppm (parts per million).

Subsequently, 1 cubic meter of the acid was intensively mixed in a corrosion-protected, closed container at 40°C with 4 cubic meters of isopropyl alcohol. After mixing, two phases were formed. The upper phase (A), containing isopropanol, phosphoric acid, and water, was separated from the lower phase (B) in which along with water about 95% of the inorganic impurities, mostly as phosphates, were contained. The separated alcohol phase (A) contained about 85% of the charged $P_2O_5$, while about 15% of the charged $P_2O_5$ was found in the aqueous bottom phase (B).

Following phase separation, the alcohol/phosphoric acid/water phase (A) was mixed with 83 liters of 50% sodium hydroxide solution. At the end of stirring, two phases (C) and (D) formed, which were separated in known manner by siphoning. The aqueous bottom phase (C), which contained the remaining inorganic impurities in the form of phosphates, was used later for working the bottom phase (B). The phosphoric acid/alcohol/$H_2O$ phase (D) was mixed with 320 liters of 50% sodium hydroxide solution using stirring and reflux cooling to form the monosodium orthophosphate. The two resulting phases (F) and (E) were then separated from one another. The upper phase (F) contained the isopropanol, which was led back into the crude phosphoric acid cleaning. The colorless bottom phase (E) contained the monosodium orthophosphate and was available for direct transmission to further working to other phosphoric acid salts.

To the separated phase (B) were added with stirring 112 kilograms of concentrated sulfuric acid. The reaction mixture was then intensively mixed with isopropyl alcohol in the volume ratio 1:3 in a closed, corrosion-protected container. With the end of mixing, again two phases formed. The bottom phase (H) contained the inorganic impurities of the phase (B) in the form of sulfates and about 3 weight-% of the original $P_2O_5$ charged as crude phosphoric acid. The phase (H) was discarded. The upper isopropanol/phosphoric acid/water phase (G) was intensively mixed with the phase (C). Upon letting the mixer come to rest, the two phases (I) and (K) formed, which were then separated from one another. The bottom phase (K) contained, along with sulfate, all remaining impurities as well as about 8 weight-% of the original $P_2O_5$ charged as crude phosphoric acid. The phase (K) was led back into the Kola crude phosphate decomposition, and the upper alcohol/phosphoric acid/water phase (I) was mixed, while being cooled, with 50% sodium hydroxide solution to form monosodium orthophosphate. Two phases formed. The upper phase (L) contained isopropanol, which was led to a new phosphoric acid cleaning step. The bottom phase (M) was a colorless monosodium orthophosphate solution, which was available for further working to other phosphoric acid salts.

The total loss of $P_2O_5$, based on the charged quantity of $P_2O_5$ in the crude phosphoric acid, was at most 3 weight-%.

The following table gives the analysis of the monosodium orthophosphate solution as formed in this Example, as based on the $P_2O_5$ content:

| | | |
|---|---|---|
| $SO_3$ | | 500 ppm |
| F | | 40 ppm |
| Ca and rare earths | < | 20 ppm |
| Fe | | 8 ppm |
| $Al_2O_3$ | < | 50 ppm |
| Cr | < | 3 ppm |
| MgO | < | 50 ppm |
| Pb | < | 0.5 ppm |
| As | | 0.5 ppm |
| V | | 7 |
| Mn | < | 3 ppm |
| Alkali (insoluble) | | 25 ppm. |

EXAMPLE II

A crude phosphoric acid obtained by the decomposition of Morocco crude phosphate with sulfuric acid contained 36 weight-% $P_2O_5$.

For removal of the organic impurities, this crude phosphoric acid was first subjected to a treatment with an organic solvent which was immiscible with the crude phosphoric acid. 1 cubic meter of crude acid was intensively mixed with 30 liters of a diesel oil/octyl alcohol mixture (volume ratio diesel oil/octyl alcohol = 4:1) at 50°C. Two phases were obtained following the mixing. The upper phase comprised the solvent mixture and contained the organic impurities of the crude acid and could be reused in other purification processes. The lower phase comprised the crude phosphoric acid freed from the organic substances. Referred to $P_2O_5$, the crude phosphoric acid now had still the following inorganic impurities:

| | |
|---|---|
| $SO_3$ | 12,500 ppm |
| F | 15,000 ppm |
| CaO | 2,500 ppm |
| $Fe_2O_3$ | 5,750 ppm |
| $Al_2O_3$ | 23,000 ppm |
| Cr | 750 ppm |
| $Na_2O$ | 70,000 ppm |
| MgO | 11,350 ppm |
| V | 1,500 ppm |
| As | 10 ppm |

The further processing of this acid to a pure monosodium orthophosphate solution proceeds analogously to the process set forth in the above Example I, however with the difference that instead of sodium hydroxide a water-free soda was used. The alcohol/phosphoric acid/water phase (A) was mixed with 40 kilograms of water-free soda and the phosphoric acid/alcohol/water phase (D) with 191 kilograms of water-free soda.

The processing of the aqueous bottom phase (B) proceeded as in Example I. The phase (B) was firstly reacted with 88 kilograms of concentrated sulfuric acid and subsequently worked further. At the end, the upper alcohol/phosphoric acid/water phase (I) obtained in the second phase-separation was neutralized with 53 kilograms of water-free soda.

The total loss of $P_2O_5$, referred to the charged quantity of $P_2O_5$, amounted to 3 weight-%. An analysis of the pure monosodium orthophosphate, as based on $P_2O_5$, gave the following results:

| | | |
|---|---|---|
| $SO_3$ | < | 200 ppm |
| F | | 150 ppm |
| CaO | < | 40 ppm |
| Fe | < | 11 ppm |
| $Al_2O_3$ | < | 50 ppm |
| Cr | < | 2 ppm |
| MgO | < | 80 ppm |
| V | < | 1 ppm |
| As | | 0.5 ppm |
| Pb | < | 0.5 ppm |
| Alkali (insoluble) | < | 50 ppm |

EXAMPLE III

A crude phosphoric acid, obtained by the decomposition of Pebble crude phosphate with sulfuric acid and concentrated to a $P_2O_5$ content of 54 weight-%, contained, except for organic impurities, the following inorganic impurities, as referred to the $P_2O_5$ content:

| | |
|---|---|
| $SO_3$ | 23,000 ppm |
| F | 40,000 ppm |
| CaO | 250 ppm |
| $Fe_2O_3$ | 25,000 ppm |
| $Al_2O_3$ | 28,000 ppm |
| Cr | 300 ppm |
| MgO | 4,100 ppm |
| As | 15 ppm |

Purification of the crude phosphoric acid proceeded continuously according to the FIGURE.

In mixer settler 1 were intensively mixed per hour at 50°C 0.5 m³ crude phosphoric acid and 33 liters of a diesel oil/octyl alcohol mixture (volume ratio diesel oil to octyl alcohol = 5:1). After subsequent phase separation, the phosphoric acid freed from the organic impurities was conducted to further cleaning, while the upper organic phase was led back into the container 1.

Subsequently, mixer settler 2 was charged with 0.5 m³ of the pre-cleaned phosphoric acid, 2 m³ isopropyl alcohol, and 36 kilograms of 50% sodium hydroxide solution and these were mixed. Following phase separation, the isopropanol/prosphoric acid/water phase (A) was mixed in mixer settler 3 with 60 kilograms per hour of 50% sodium hydroxide solution under intensive stirring. The separated alcohol/phosphoric acid/water phase (D) was then mixed in mixer settler 4 with 260 kilograms of 50% NaOH per hour for the purpose of forming salt. Following phase separation, the isopropanol phase (F) was conducted through a heat exchanger 5 and again charged to mixer settler 2. The aqueous phase (E) contained the resulting pure monosodium orthophosphate.

The bottom phase (B) arising in mixer settler 2 contained 95% of the inorganic impurities of the crude acid in the form of phosphates. It was mixed in mixer settler 6 with 37.8 kilograms of concentrated sulfuric acid and 300 liters of isopropyl alcohol per hour. Of the resulting two phases, the phase (H) contained the inorganic impurities, primarily in the form of sulfates, as well as about 3 weight-% of the total charged phosphorus pentoxide. The phase (H) was discarded. The lighter alcohol/phosphoric acid/water phase (G) was mixed in mixer settler 7 with the phase (C). After renewed phase separation, the bottom phase (K), which still contained about 5 weight-% of the charged $P_2O_5$, was fed back into the crude phosphate decomposition process. The alcohol/phosphoric acid/water phase (I) was finally mixed under stirring in mixer settler 8 with 43 kilograms of 50% NaOH per hour. After phase separation and cooling in cooling system 9, the isopropanol phase (L) was fed back into mixer settler 6. The separated phase (M) comprised a pure monosodium phosphate solution. The $P_2O_5$ loss, referred to the total $P_2O_5$ charged in the form of crude phosphoric acid, amounted to about 3 weight-%. The pure monosodium phosphate solution, referred to $P_2O_5$, gave the following analysis:

| | | |
|---|---|---|
| $SO_3$ | < | 500 ppm |
| F | | 200 ppm |
| CaO | < | 40 ppm |
| Fe | | 15 ppm |
| $Al_2O_3$ | < | 50 ppm |
| Cr | | 2 ppm |
| MgO | < | 40 ppm |
| V | | 3 ppm |
| As | | 0.5 ppm |
| Pb | < | 0.5 ppm |
| Mn | < | 1 ppm |
| Alkali (insoluble) | < | 80 ppm |

EXAMPLE IV

A crude phosphoric acid, obtained from the decomposition of Morocco crude phosphate with sulfuric acid and following a filtration concentrated to a $P_2O_5$ content of 48 weight-%, contained the following impurities as referred to $P_2O_5$:

| | |
|---|---|
| $SO_3$ | 16,500 ppm |
| F | 26,500 ppm |
| CaO | 11,400 ppm |
| $Fe_2O_3$ | 7,740 ppm |
| $Al_2O_3$ | 25,800 ppm |
| Cr | 770 ppm |
| $Na_2O$ | 52,000 ppm |
| MgO | 11,300 ppm |
| V | 2,100 ppm |
| As | 15 ppm |

The further processing of this acid to pure monosodium orthophosphate solution was as in Example I, however, with the difference that a mixture of isopropyl alcohol and amyl alcohol was used instead of isopropyl alcohol alone. In the mixture, the volume ratio of the two alcohols was 1:1.

An analysis of the pure monosodium orthophosphate gave the following results, as based on the $P_2O_5$ content:

| | | |
|---|---|---|
| $SO_3$ | < | 500 ppm |
| F | | 200 ppm |
| CaO | < | 40 ppm |
| Fe | < | 10 ppm |
| $Al_2O_3$ | < | 50 ppm |
| Cr | < | 2 ppm |
| MgO | < | 80 ppm |
| V | < | 1 ppm |
| As | | 1 ppm |
| Pb | < | 0.5 ppm |
| Alkali (insoluble) | < | 40 ppm |

The $P_2O_5$ loss, as based on the $P_2O_5$ content of the charged crude phosphoric acid, was at about 3 weight-%.

EXAMPLE V

A crude phosphoric acid obtained by the decomposition of Morocco crude phosphate with sulfuric acid and concentrated following a filtration to a $P_2O_5$ content of 48 weight-%, contained the impurities as given in Example IV. With regard to quantities, however, the acid of the present Example differed from the acid of Example IV in that it contained instead of 52,000 ppm $Na_2O$ only 600 ppm.

The further processing of the crude phosphoric acid to pure monosodium orthophosphate was done according to the particulars given in Example I; however, instead of isopropyl alcohol, a mixture containing 70 parts by volume hexyl alcohol and 30 parts by volume isopropyl was used.

An analysis of the pure monosodium orthophosphate solution gave the following results, as based on $P_2O_5$:

| | | |
|---|---|---|
| $SO_3$ | < | 500 ppm |
| F | | 300 ppm |
| CaO | < | 40 ppm |
| Fe | < | 10 ppm |
| $Al_2O_3$ | < | 50 ppm |
| Cr | < | 2 ppm |
| MgO | < | 80 ppm |
| V | < | 1 ppm |
| As | | 0.5 ppm |
| Pb | < | 0.5 ppm |
| Alkali (insoluble) | < | 30 ppm |

The $P_2O_5$ loss, referred to the total $P_2O_5$ charged for purification, amounted to 2.5 weight-%.

EXAMPLE VI

A crude phosphoric acid, which was produced by the decomposition of Morocco crude phosphate with sulfuric acid and concentrated to a P₂O₅ content of 48 weight-% following a filtering, was charged to the process. It contained the impurities as set forth in Example V. The processing to pure monosodium orthophosphate solution was continuous in the manner of Example 3, however with the difference that, instead of isopropyl alcohol, butyl alcohol was used and no NaOH was added to container 2.

An analysis of the pure monosodium orthophosphate solution as based on P₂O₅ gave the same results as shown in Example IV.

The P₂O₅ loss, referred to the total amount of P₂O₅ charged to the process, amounted to 3.5 weight-%.

It will be understood that the above description of the present invention is susceptible to various modifications, changes and adaptations, and the same are intended to be comprehended within the meaning and range of equivalents of the appended claims.

We claim:

1. A method for producing pure phosphate from crude phosphoric acid, comprising the steps of:
   a. mixing crude phosphoric acid with an alcohol or alcohol mixture having the ability to absorb at least 9 weight-% water as based on solution weight and which forms a water/phosphoric acid/alcohol phase, the volume ratio of the phosphoric acid to the alcohol being from the range 1:025 to 1:20, in the presence of at least one dissolved alkali or ammonium compound;
   b. withdrawing from step a) the water/phosphoric acid/solvent phase;
   c. mixing with the water/phosphoric acid/solvent phase of step b) at least one basic compound selected from the group consisting of alkali oxides, alkali hydroxides, alkali carbonates, alkali phosphates, ammonia, ammonia hydroxides, and ammonium salts, in an amount equal to 1 to 40 weight-% calculated as oxide and based on the amount required for producing monoalkali — or monoammonium-orthophosphate from the phosphoric acid present in said water/phosphoric acid/solvent phase thereby removing inorganic impurities from said water/phosphoric acid/solvent phase;
   d. withdrawing from step c) a purer water/phosphoric acid/solvent phase;
   e. adding to the water/phosphoric acid/solvent phase of step d) a basic compound for causing at least the said mono-orthophosphate to pass from said water/phosphoric acid/solvent phase of step d) into an aqueous phase; and
   f. recovering said aqueous phase containing said mono-orthophosphate; wherein the temperature in steps a) through e) is from 5° to 100°C.

2. A method as claimed in claim 1, wherein said alcohol, is Isopropylalcohol or butylalcohol.

3. A method as claimed in claim 1, wherein said alcohol mixture is a mixture of isopropanol and at least one aliphatic alcohol having 4 to 9 carbon atoms.

4. A method as claimed in claim 1, the alkali content in step a) being, calculated as oxide, from 0.1 to 6 weight-% as based on the phosphoric acid.

5. A method as claimed in claim 1, wherein step c) is performed with an amount of said basic compound equal to 10 to 30 weight-%, calculated as alkali oxide and based on the amount required for producing monoorthophosphate.

6. A method as claimed in claim 1, which further comprises:
   b'. withdrawing from step a) the aqueous phase;
   c'. mixing this aqueous phase of step b') with at least an amount of sulfuric acid required to release as phosphoric acid the phosphate therein;
   d'. adding to the thus-treated aqueous phase of step c') an alcohol or alcohol mixture capable of absorbing at least 9 weight-% water as based on solution weight for removing the thus-liberated phosphoric acid from the resulting sulfate-containing mixture and into a second solvent phase;
   e'. mixing said second solvent phase with the aqueous phase remaining after step d);
   f'. separating the resulting organic aqueous phases from one another;
   g'. mixing said organic phase from step f') with at least one basic compound selected from the group consisting of alkali compounds, ammonia, ammonium hydroxide and ammonium salts for forming at least monoalkali or monoammonium orthophosphate; and
   h'. passing said aqueous phase from step b'), to a step for decomposing crude phosphate with sulfuric acid.

7. A method as claimed in claim 1, further comprising the steps of recovering said alcoholic solvent from step (e) and recycling the recovered solvent to step a).

8. A method as claimed in claim 1, wherein steps a) to e) are performed continuously.

9. A method as claimed in claim 1, further comprising, before step a), the step of extracting with a water-immiscible organic solvent organic immpurities present in said crude phosphoric acid.

10. A method as claimed in claim 9, wherein the waterimmiscible organic solvent in the step of extracting is at least one oxygen-containing organic compound having 5 to 20 carbon atoms.

11. A method as claimed in claim 10, wherein the waterimmiscible oxygen-containing organic solvent of the step of extracting contains at least one compound selected from the group consisting of aliphatic, aromatic and cyclic hydrocarbons having 6 to 20 carbon atoms.

12. A method as claimed in claim 11, wherein the volume ratio of hydrocarbon to oxygen-containing organic solvent amounts to from 0.1:1 to 10:1.

13. A method as claimed in claim 12, wherein the step of extracting is carried out at a temperature between 10° and 100°C.

* * * * *